(12) United States Patent
Senci et al.

(10) Patent No.: US 12,067,576 B2
(45) Date of Patent: Aug. 20, 2024

(54) COMPUTER-IMPLEMENTED SYSTEM AND METHOD FOR ISOLATING PAYMENT MESSAGES HAVING DEFICIENT STANDARD DATA ELEMENTS

(71) Applicant: Mastercard International Incorporated, Purchase, NY (US)

(72) Inventors: David J. Senci, Troy, IL (US); Kyle T. Williams, Wentzville, MO (US); John Robert Hierholzer, Upper Nyack, NY (US)

(73) Assignee: Mastercard International Incorporated, Purchase, NY (US)

( * ) Notice: Subject to any disclaimer, the term of this patent is extended or adjusted under 35 U.S.C. 154(b) by 724 days.

(21) Appl. No.: 16/853,809

(22) Filed: Apr. 21, 2020

(65) Prior Publication Data

US 2021/0326894 A1 Oct. 21, 2021

(51) Int. Cl.
*G06Q 20/42* (2012.01)
*G06Q 20/38* (2012.01)
*G06Q 20/40* (2012.01)

(52) U.S. Cl.
CPC .......... *G06Q 20/42* (2013.01); *G06Q 20/389* (2013.01); *G06Q 20/4016* (2013.01)

(58) Field of Classification Search
CPC .......... G06Q 20/38–425; G06Q 20/42; G06Q 20/389; G06Q 20/4016
USPC .......................................................... 705/75
See application file for complete search history.

(56) References Cited

U.S. PATENT DOCUMENTS

| | | | | |
|---|---|---|---|---|
| 10,043,182 B1* | 8/2018 | Bharghavan | ....... | G06Q 20/4015 |
| 2013/0198075 A1* | 8/2013 | Sakata | .................. | G06Q 30/06 |
| | | | | 705/44 |
| 2014/0250011 A1* | 9/2014 | Weber | ................ | G06Q 20/4016 |
| | | | | 705/44 |
| 2015/0134528 A1* | 5/2015 | Fineman | ................ | G06Q 20/24 |
| | | | | 705/44 |
| 2016/0321634 A1* | 11/2016 | George | ................ | G06Q 20/202 |

(Continued)

OTHER PUBLICATIONS

Visa Merchant Data Standards Manual, Oct. 2015 available via https://web.archive.org/web/20160415142930/https://usa.visa.com/content/dam/VCOM/download/merchants/visa-merchant-data-standards-manual.pdf (Year: 2015).*

(Continued)

*Primary Examiner* — Courtney P Jones
(74) *Attorney, Agent, or Firm* — Hovey Williams LLP

(57) ABSTRACT

A computer-implemented method for isolating transaction records having deficient standard data elements. The method may include: acquiring a first transaction record corresponding to a transactional entity, the first transaction record including a set of standard data fields in a first state; acquiring a second transaction record corresponding to the transactional entity, the second transaction record including the set of standard data fields in a second state; analyzing the first state and the second state to identify a deficiency of the standard data fields of one or both of the first transaction record and the second transaction record, the deficiency corresponding to a misclassification of an installment payment transaction of the transactional entity; and storing a record of the misclassification, the record identifying one or both of the first transaction record and the second transaction record.

18 Claims, 4 Drawing Sheets

(56) References Cited

U.S. PATENT DOCUMENTS

| | | | | |
|---|---|---|---|---|
| 2017/0148020 | A1* | 5/2017 | Vienravee | G06Q 20/325 |
| 2019/0205993 | A1* | 7/2019 | Rodriguez | H04L 67/535 |
| 2019/0378126 | A1* | 12/2019 | Hagey | G06Q 20/387 |
| 2020/0074434 | A1* | 3/2020 | Chen | G06Q 20/102 |
| 2021/0049616 | A1* | 2/2021 | Gupta | G06F 16/9566 |
| 2021/0056618 | A1* | 2/2021 | Brown | G06Q 40/02 |
| 2021/0150624 | A1* | 5/2021 | Tucker | G06Q 20/405 |
| 2021/0182809 | A1* | 6/2021 | Sukhija | G07G 1/0036 |
| 2022/0198451 | A1* | 6/2022 | Alterman | G06Q 20/40 |
| 2022/0245641 | A1* | 8/2022 | Wintle | G06Q 20/22 |

OTHER PUBLICATIONS

Rebecca Lake, How to Find and Cancel Recurring Credit Card Charges: Gray charges can cost you more than you might think, U.S. News & World Report, Jun. 10, 2019 available via https://money.usnews.com/credit-cards/articles/how-to-find-and-cancel-recurring-credit-card-charges (Year: 2019).*

Taylor, Susan Johnston, "6 free tools to stop recurring card charges," pp. 1-4, Jan. 18, 2017, www.creditcards.com/credit-card-news/free-tools-to-stop-recurring-charges/.

* cited by examiner

COMPUTER-IMPLEMENTED SYSTEM AND METHOD FOR ISOLATING PAYMENT MESSAGES HAVING DEFICIENT STANDARD DATA ELEMENTS

FIELD OF THE INVENTION

The present disclosure generally relates to computer-implemented methods, systems comprising computer-readable media, and electronic devices for isolating payment messages with deficient standard data elements. More particularly, the present disclosure relates to computer-implemented methods, systems comprising computer-readable media, and electronic devices for isolating deficient payment messages corresponding to installment transactions.

BACKGROUND

Payment systems operated by payment processors exchange and process messages according to standardized data protocols. Routing and treatment of those messages in connection with payment transactions, as well as subsequent risk and other data analyses, depend on adherence to those data protocols by participants in and contributors to such systems. For instance, standardized data fields have been established for categorizing a plurality of constituent payment authorization messages as forming part of an installment payment agreement. However, in the absence of proper adherence by contributors to the protocols for populating such fields, payment processors are unable to identify and properly categorize such messages, allowing them to instead remain hidden among the many tens of millions of more common single payment messages processed each day.

This background discussion is intended to provide information related to the present invention which is not necessarily prior art.

BRIEF SUMMARY

Embodiments of the present technology relate to computer-implemented methods, systems comprising computer-readable media, and electronic devices for detecting and handling non-reported installment plans.

More particularly, in a first aspect, a computer-implemented method for isolating transaction records having deficient standard data elements may be provided. The method may include acquiring a first transaction record corresponding to a transactional entity, the first transaction record including a set of standard data fields in a first state; acquiring a second transaction record corresponding to the transactional entity, the second transaction record including the set of standard data fields in a second state; analyzing the first state and the second state to identify a deficiency of the standard data fields of one or both of the first transaction record and the second transaction record, the deficiency corresponding to a misclassification of an installment payment transaction of the transactional entity; and storing a record of the misclassification, the record identifying one or both of the first transaction record and the second transaction record.

In a second aspect, a computer system is configured to isolate transaction records having deficient standard data elements. The system includes a processing element configured to: acquire a first transaction record corresponding to a transactional entity, a merchant, and a merchant type, the first transaction record including a set of standard data fields in a first state; acquire a second transaction record corresponding to the transaction entity, the merchant, and the merchant type, wherein the second transaction record includes the set of standard data fields in a second state; determine that the merchant type is indicative that the transaction relates to a smartphone purchase; analyze the first state and the second state to identify a deficiency of the standard data fields of both of the first transaction record and the second transaction record, the deficiency corresponding to a misclassification of an installment payment transaction of the transactional entity; and store a record of the misclassification, the record identifying one or both of the first transaction record and the second transaction record.

In a third aspect, a non-transitory computer readable storage medium having a computer program stored thereon for isolating transaction records having deficient standard data elements may be provided. The computer program instructs the processing element to perform steps including: acquiring a first transaction record corresponding to a transactional entity, a merchant, and a merchant type, wherein the first transaction record includes a set of standard data fields in a first state; acquiring a second transaction record corresponding to the transaction entity, the merchant, and the merchant type, wherein the second transaction record includes the set of standard data fields in a second state; determining that the merchant type is indicative that the transaction relates to a smartphone purchase; analyzing the first state and the second state to identify a deficiency of the standard data fields of both of the first transaction record and the second transaction record, the deficiency corresponding to a misclassification of an installment payment transaction of the transactional entity; and storing a record of the misclassification, the record identifying one or both of the first transaction record and the second transaction record.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems, devices and methods for detecting and correcting non-reported installment plan payments. Specific embodiments of the technology will now be described in connection with the attached drawing figures. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary Environment

Figure 1:
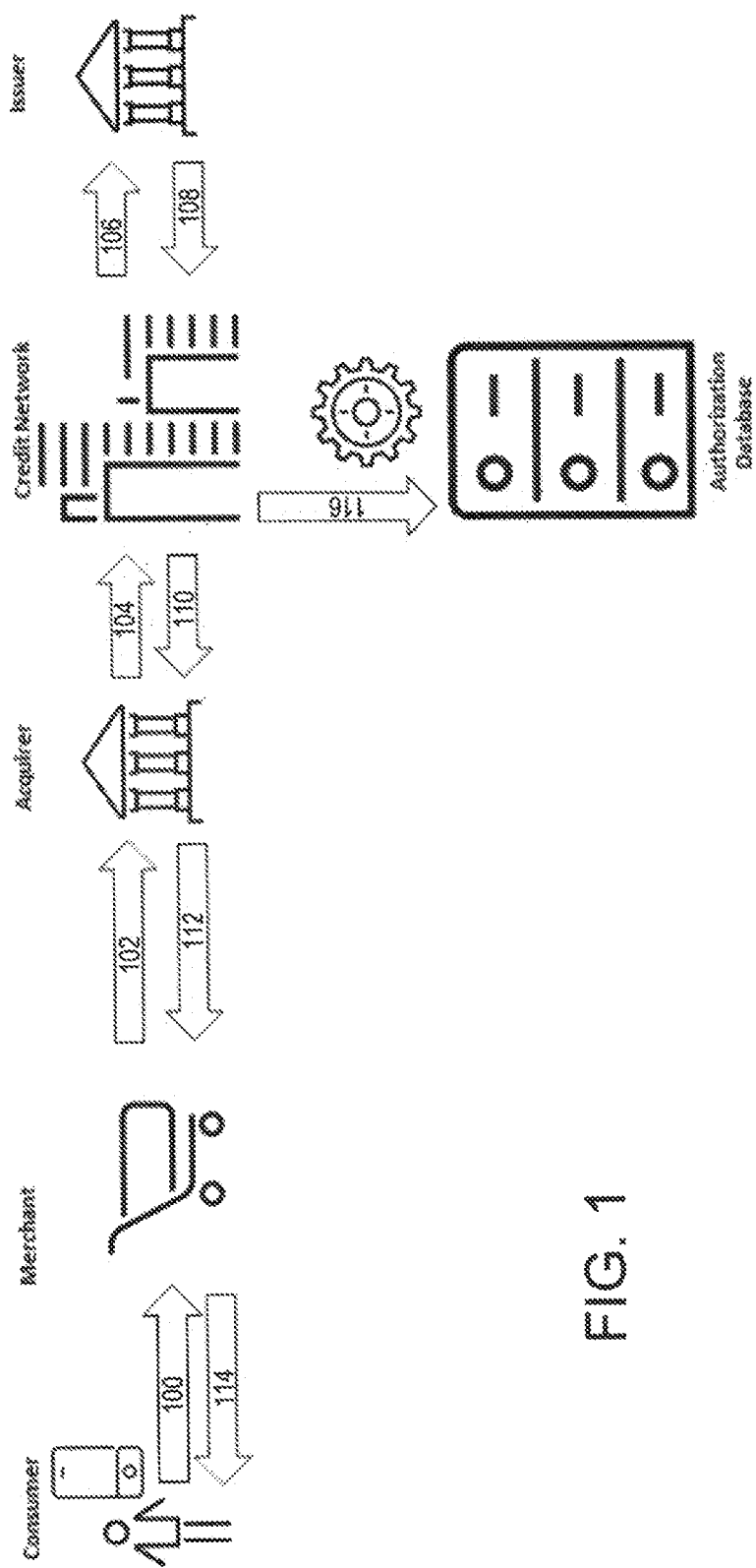
FIG. 1 is a schematic diagram illustrating a multi-party transaction card industry system for processing transactions.

Turning to the Figures, FIG. 1 depicts a general flow diagram used by an exemplary system for processing payments. The exemplary system may utilize embodiments of the invention to determine non-reported installment payments and take any of various remedial actions. The steps described in detecting the non-reported installment plans may be performed concurrently with the processing of the transactions, subsequent to the processing of the transactions, or at some other time. FIG. 1 depicts an example of a complete transaction process. However, it should be appreciated that in some embodiments, more or fewer entities may be involved. Further, the steps described herein as being performed by a certain entity may additionally or alternatively performed by another entity.

In Step 100, a transactional entity or consumer agrees to a lease, installment payments, or other serialized payment plan for a certain device or other good. Typically, this device will involve an ongoing obligation by the consumer to pay for the device. The fact of this ongoing obligation to pay is considered in connection with approval/denial of transaction requests involving the consumer. The ongoing obligation may affect the amount or the types of other transactions that may be approved or denied, the conditions upon which other transactions will be approved or denied, and/or the characteristics of such approvals. Where the fact of an ongoing financial obligation is not communicated to such decision makers (such as the issuer, discussed below), assessments of risk by, for example, an issuer, may be incomplete or erroneous.

As a non-limiting example, a consumer may purchase a smartphone or other computing device. More particularly, the consumer may agree to purchase an $800 smartphone for $33 per month. The merchant may offer this deal to the consumer so long as the consumer participates in a qualifying phone plan, utilizes a qualifying phone plan company, or meets some other requirement(s). Accordingly, the merchant will charge the consumer the $33 on a monthly basis. However, the merchant may simply bill this amount as a single transaction each month, without informing the issuer of the total financial obligation of which the $33 charge is a part. The issuer (or other approver) may therefore make decisions on approval/denial of the consumer's requests without an understanding of the total obligation the consumer has to the merchant.

The "merchant" may be any entity that is conducting the transaction with the consumer. The merchant may be a local brick-and-mortar store, website or other online resource selling cell phone plans and cell phones (to follow the above example). The merchant may alternatively be the cell phone plan provider and/or the cell phone manufacturer with whom the consumer is dealing directly.

In Step 102, the merchant submits a transaction request message to the acquirer. The acquirer receives and processes the transaction request message. For example, the acquirer may be the manufacturer and/or maintainer of the financial transaction hardware and software that is at (or otherwise associated with) the merchant. Thus, when the user inserts a credit card into a terminal at the merchant, for example, the software running the terminal communicates with the acquirer for processing and approval of the payment.

It should be noted here that merchants may be incentivized not to correctly report certain installment transactions. Smartphones are a good example of a type of good that is often the subject of non-reported installment transactions. Merchants are commonly offering these smartphones as an incentive to join a cellular network to which they are associated. Many merchants recognize that if the full financial obligation associated with such a transaction were disclosed, there would be a reduced chance that the transaction would be approved. A merchant would lose out on a sale of the smartphone as well as the ongoing phone plan if the transaction were denied. The merchant thus has an incentive to not fully divulge information up the chain.

Embodiments of the invention are configured to identify and rectify transactions not indicative of the installment payment with which they are associated. It should be appreciated that there exists an under-utilized method of reporting these installment payments. Thus, embodiments of the invention are configured to identify the transaction request messages that are not utilizing the existing format for reporting such.

The International Organization for Standardization (ISO) specifies certain data fields for exchange in financial transactions. For example, ISO 8583 specifies message structure, format and content, data elements and values for data elements comprising a common interface by which financial transaction card-originated messages can be interchanged. While certain transaction data elements may be considered optional and others required under common implementations of ISO 8583, depending on the processing entity(ies) and/or regions in question for example, such variances are well understood by a person of ordinary skill. In this regard, the following generally known standards for completing financial transactions are hereby incorporated by reference: ISO 8583 Part 1: Messages, data elements and code values (2003); ISO 8583 Part 2: Application and registration procedures for Institution Identification Codes (IIC) (1998); and ISO 8583 Part 3: Maintenance procedures for messages, data elements and code values (2003)). The fields defined by ISO standards (e.g., 8583 and 18245) may include: primary account number (Field 2); transaction type (Field 3); amount transaction (Field 4); transmission date and time (Field 7); retrieval reference number (Field 37); response code (Field 39); card acceptor name/location (Field 43); personal identification number (Field 52); merchant type (Field 18); and installment information (Field 112).

Data Element 112 Sub Element 27 has several bytes within it designated for a plurality of data types. Fields designated for installment payment data include: total number of installments (2-byte field); current installment number (2-byte field); total installment amount (12-byte field in cardholder billing currency); and current installment amount (12-byte field in cardholder billing currency). These fields, when they are populated, may be utilized to determine the total value of an item/authorization. However, as noted above, merchants often fail to properly populate these fields.

The set of standard data fields may include a date data field and/or a timestamp data field. The date data field sets out the transaction date. Thus, for example, the date data field of a first transaction record and a second transaction record includes data elements corresponding to respective transaction dates. In the embodiments described herein, deficiencies with respect to the contents of transaction records (discussed in more detail below) may be at least in part identified based on a determination that the transaction dates for the first transaction record and the second transaction record respectively fall on the same day of two different months. This is because it is common for installment plans to be transacted on the same day of consecutive months.

The set of standard data fields may also include an amount data field. The amount data field sets out the amount of the requested or completed transaction. Thus, the amount data field of the exemplary first transaction record and the second transaction records data elements reflecting respective transaction amounts. In the embodiments discussed in more detail below, a deficiency may be at least in part identified based on a determination that the transaction amounts for the first transaction record and the second transaction record are identical. This is because it is common for installment plans to be of the same amount in the successive payments.

The set of standard data fields may include a consumer identifier data field. The consumer identifier data field provides various information about the consumer or other transactional entity that is requesting the transaction. Thus, the consumer identifier data field of the first transaction record including data elements correspond to the consumer requesting the transaction. The information may include a name of the consumer, an identification number of the consumer, an account number of the consumer, or other identifying information. The second transaction record (discussed below) may be selected based upon a historical analysis of the consumer requesting the transaction of the first transaction record, as discussed in regard to FIG. 4.

The set of standard data fields may include a merchant type data field. The merchant type data field provides an indication of the type of merchant which is requesting the transaction. Thus, the merchant type data field of the first transaction record and the second transaction record include data elements corresponding to respective types of merchants. In embodiments of the present invention discussed in more detail below, a deficiency may be at least in part identified based on a determination that the merchant types for the first transaction record and the second transaction record are identical and indicative of a merchant type that may offer installment plans. An example of this may be a merchant type that is a smartphone retailer.

One of ordinary skill would immediately understand that the format and content of the aforementioned data elements and fields may vary, and that they and the parameters and metadata outlined herein are merely exemplary. For example, exemplary data elements of embodiments of the present invention may be included in one or more existing fields provided for under the ISO 8583 standard, and/or may be given meaning according to one or more message type indicators and/or bitmaps in a manner analogous to common practice under the ISO 8583 standard. However, exemplary data elements of embodiments of the present invention may be otherwise obtained, stored and utilized in the framework(s) discussed herein, for example under different mapping and message header protocols, without departing from the spirit of the present invention.

Returning to discussion of the scenario outlined above, the merchant selling the smartphone on an installment plan will continue to submit an individual payment request message to the acquirer each month as part of the installment payment. It should also be appreciated that in some embodiments of the invention, an acquirer may not be present. The merchant may interact directly with the credit network (as discussed below).

As noted elsewhere herein, may individual payment request messages will omit valuable installment plan-related information. Thus, referring briefly to step 110 discussed below and in connection with FIG. 4, in embodiments of the present invention transaction request messages will be analyzed to identify serialized payment plans so that remedial actions may be taken.

In Step 104, the acquirer submits the transaction request message to a credit network. The credit network further processes the transaction request message for submission to a final approval authority, such as the issuing bank or other issuer. Referring briefly again to step 110 discussed below and in connection with FIG. 4, in embodiments of the present invention the credit network also provides an installment plan detection service to the issuer in connection with such processing. Embodiments of the invention may thus be utilized by the credit network as a value-added service in addition to the other services being provided. It should also be appreciated that in other embodiments, all or portions of the steps discussed herein may be performed by the merchant and/or the issuer.

In Step 106, the credit network sends the authorization to the issuer for approval. It is the issuer with which the consumer has an account, and it is the issuer that makes the final determination of whether the issuer will accept the financial obligations the consumer is requesting.

It should be reiterated here that, in some instances, transaction request messages do not reflect the full debts and/or liabilities to which consumers have agreed. Thus, issuers may unwittingly make decisions based upon incomplete or incorrect information. These decisions can include whether to approve a present or subsequent transaction request, what conditions to use for approval, what other actions to allow a user to take, or the like. In many cases, inability to accurately assess credit risk in connection with those decisions can lead to unacceptable losses by an issuer, particularly in connection with high-risk, low-credit customers.

In Step 108, the issuer checks certain criteria and sends a reply, such as a transaction approval message. Examples of the criteria checked may include an open to buy amount (e.g., a consideration of the amount of financial obligations to which the consumer has previously agreed compared to the maximum allowed by the issuer), fraud rules (to determine whether the issuer believes that it is in fact the consumer making the request), and other considerations. Criteria may be specific to the individual consumer, specific to a group of consumers of which the consumer is a member, specific to a certain credit line or credit card plan to which the consumer is a member, specific to the issuer, and/or contained in a contract between the issuer and the consumer.

In Step 110, the credit network sends the reply, (e.g., the transaction approval message) to the acquirer. A transaction approval message indicates that the issuer has approved the transaction request message. In Step 112, the acquirer sends a transaction approval message to the merchant. In Step 114, the merchant informs the customer that the transaction was approved. The customer leaves with the product.

In Step 116, the credit network monitors transactions over time. This step may include accessing an authorization database, as illustrated in FIG. 1. The authorization database includes records reflecting past authorizations and/or requests. The past authorizations may be organized by consumer, merchant, acquirer, chronologically, and/or by other method(s). The past authorizations may also be searchable, for instance in a manner that permits past authorizations having similar characteristics (as described below) to be identified and further analyzed. It is through this monitoring that non-reported installment payments may be identified in embodiments of the invention. The steps of this analysis are discussed in more detail below in connection with FIG. 4. As discussed above, in some embodiments, these steps are performed by the issuer and/or the acquirer.

The credit network, or other entity, may take remedial action if a deficient payment message is found in Step 116. The remedial action, for example, as discussed in more detail below, may involve generating a notification to the issuer outlining a suspicion of an improperly labeled installment transaction, implementing a block for future attempted installment payments without proper labeling, or the like. The remedial action may also or alternatively request confirmation of the identified installment payment determination from the merchant, the consumer, or another entity. One of ordinary skill will appreciate that the remedial actions outlined herein are merely exemplary, and that identification of a deficient payment message may lead to a variety of actions within the scope of the present invention.

Exemplary System

Figure 2:
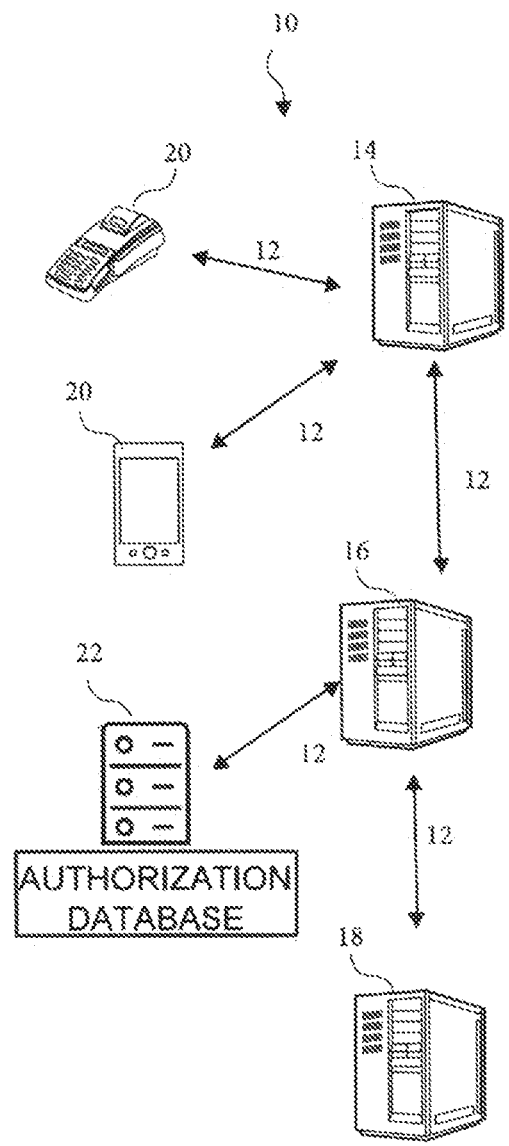
FIG. 2 is a block schematic diagram showing various hardware devices of an exemplary system for processing transactions.

FIG. 2 depicts an exemplary environment in which embodiments of a system 10 may be utilized for processing transactions. The environment may include communication links 12 for enabling communications between components of the system 10. The system 10 may include a an acquirer server 14, a network server 16, and an issuer server 18. The acquirer server 14 may issue instructions for the performance of transactions requested by a point of sale device 20 (e.g., one or more terminal assembly(ies) and/or a plurality of mobile electronic devices such as illustrated in FIG. 2).

The point of sale device 20 may transmit transaction data to the acquirer server 14 for processing of each transaction, as described in more detail below. The acquirer server 14 may transmit at least a portion of the transaction data, e.g., as part of a transaction request, to a network server 16. The network server 16 may process the transaction request with an issuer server 18 within existing production according to generally accepted methods. The network server 16 may also provide a response to the acquirer server 14. The response or portions thereof may be transmitted by the acquirer server 14 to the point of sale device 20 for analysis regarding the approval (including any conditions thereon). Moreover, in an embodiment the network server 16 and/or issuer server 18 may bypass the acquirer server 14 to transmit a transaction notification including one or more elements of the transaction data directly to the point of sale device 20. Such transaction notifications may be transmitted via one or more communication links 12.

Broadly, the communication links 12 may allow communication between the various components illustrated in FIG. 2. The communication links 12 may include local area networks, metro area networks, wide area networks, cloud networks, the Internet, cellular networks, plain old telephone service (POTS) networks, and the like, or combinations thereof. The communication links 12 may be wired, wireless, or combinations thereof and may include components such as modems, gateways, switches, routers, hubs, access points, repeaters, towers, and the like. For example, the mobile electronic devices 20 and terminal assemblies 18 may generally connect to the communication links 12 wirelessly, such as radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof.

Each server 14, 16, 18 generally retains electronic data and may respond to requests to retrieve data as well as to store data. The servers 14, 16, 18 may be embodied by application servers, database servers, file servers, gaming servers, mail servers, print servers, web servers, or the like, or combinations thereof. Furthermore, the servers 14, 16, 18 may include a plurality of servers, virtual servers, or combinations thereof. The servers 14, 16, 18 may be configured to include or execute software such as file storage applications, database applications, email or messaging applications, web server applications, or the like, in addition to and/or in conjunction with software applications.

The servers 14, 16, 18 may apply business methods or algorithms, may utilize lookup tables or databases, receive user input via one or more peripheral devices or associated systems, or perform other tasks. For example, the acquirer server 14 may perform such tasks in order to maintain a database of and/or issue payment instructions to the point of sale device 20, to receive and analyze transaction request messages, to configure transaction data, and to perform other functions. The acquirer server 14 may perform such tasks in order to act as a secure gateway to receive encrypted transaction data and other associated data, to observe and record certain details regarding each transaction, to forward transaction requests to the network server 16, to encrypt and forward responses from the network server 16 to the point of sale device 20, and to perform other functions in response to (for example) data elements included within transaction data.

Figure 3A:
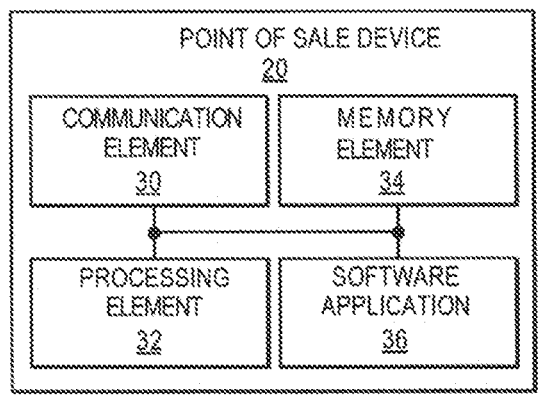
FIGS. 3A, 3B, 3C and 3D respectively illustrate, in block schematic form, various components of the exemplary devices shown in FIG. 2; and, FIG. 4 illustrates exemplary steps performed by a processing element in detecting non-reported installment plans.
Figure 3B:
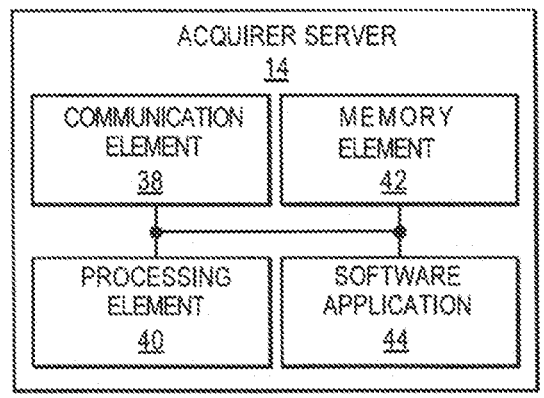
Figure 3C:
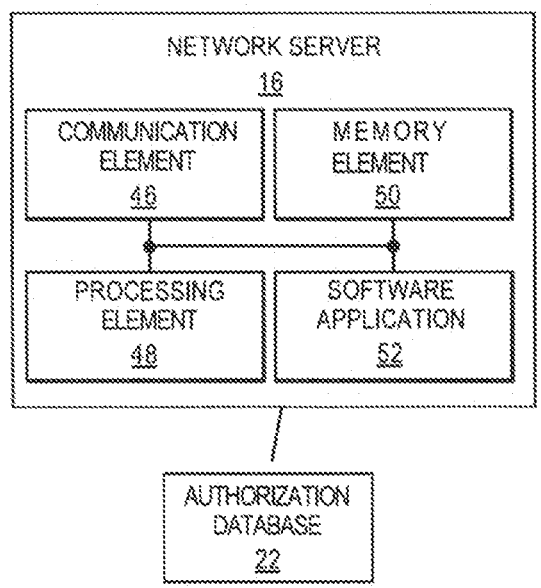
Figure 3D:
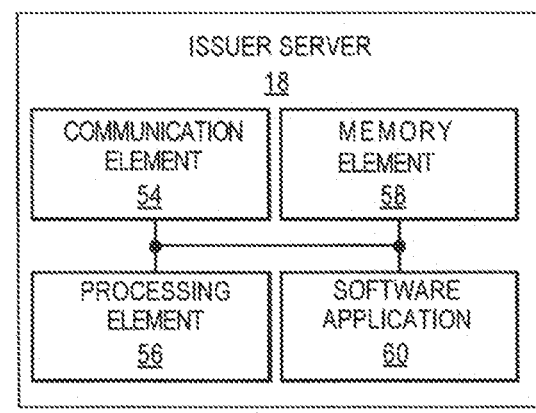

Turning now to FIGS. 3A-D, internal components of the hardware shown in FIG. 2 are further shown and described. FIG. 3A shows exemplary components of the point of sale device 20. FIG. 3B shows exemplary components of the acquirer server 14. FIG. 3C shows exemplary components of the network server 20. FIG. 3D shows exemplary components of the issuer server 18.

As shown in FIG. 3A, the point of sale device 20 may include a communication element 30, a processing element 32, and a memory element 34. The memory element 34 is a non-transitory computer readable storage medium having a software application 36 stored thereon. The processing element 32 is configured to execute the software application 36. The software application 36 instructs the processing element 32 to perform the various steps discussed herein, which may include sending and receiving information via the communication element 30.

As shown in FIG. 3B, the acquirer server 14 may include a communication element 38, a processing element 40, and a memory element 42. The memory element 42 is a non-transitory computer readable storage medium having a software application 44 stored thereon. The processing element 40 is configured to execute the software application 44. The software application 44 instructs the processing element 40 to perform the various steps discussed herein, which may include sending and receiving information via the communication element 30. As shown in FIG. 3C, the network server 16 may include a communication element 46, a processing element 48, and a memory element 50. The memory element 50 is a non-transitory computer readable storage medium having a software application 52 stored thereon. The processing element 48 is configured to execute the software application 52. The software application 52 instructs the processing element 48 to perform the various steps discussed herein, which may include sending and receiving information via the communication element 46. The network server 16 may also access the authorization database 22, which may be a component of the network server 16 or otherwise associated with the network server 16. The authorization database 22 may be a data store or other repository of information.

As shown in FIG. 3D, the issuer server 18 may include a communication element 54, a processing element 56, and a memory element 58. The memory element 58 is a non-transitory computer readable storage medium having a software application 60 stored thereon. The processing element 56 is configured to execute the software application 60. The software application 60 instructs the processing element 56 to perform the various steps discussed herein, which may include sending and receiving information via the communication element 54.

The communication elements 30, 38, 46, and 54 generally allow communication with external systems or devices. The communication elements 30, 38, 46, and 54 may include signal or data transmitting and receiving circuits, such as antennas, amplifiers, filters, mixers, oscillators, digital signal processors (DSPs), and the like. The communication elements 30, 38, 46, and 54 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication elements 30, 38, 46, and 54 may establish communication through connectors or couplers that receive metal conductor wires or cables which are compatible with networking technologies such as ethernet. In certain embodiments, the communication elements 30, 38, 46, and 54 may also couple with optical fiber cables. The communication elements 30, 38, 46, and 54 may be in communication with or electronically coupled to memory elements 34, 42, 50, and 58 and/or processing elements 32, 40, 48, and 56.

In embodiments, the devices of the system 10 communicate via secure and/or encrypted communication. For example, all or some of the acquirer server 14, the network server 16, the issuer server 18, and the point of sale device 20 may utilize Mutual Secure Sockets Layer (MSSL) technology for authenticating and exchanging transmissions.

The memory elements 34, 42, 50, and 58 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 34, 42, 50, and 58 may include, or may constitute, a "computer-readable medium." The memory elements 38, 40 may store the instructions, code, code segments, software, firmware, programs, applications, apps, services, daemons, or the like that are executed by the processing elements 32, 40, 48, and 56. The memory elements 34, 42, 50, and 58 may also store settings, data, documents, sound files, photographs, movies, images, databases, and the like.

The processing elements 32, 40, 48, and 56 may include processors, microprocessors, microcontrollers, DSPs, field-programmable gate arrays (FPGAs), analog and/or digital application-specific integrated circuits (ASICs), or the like, or combinations thereof. The processing elements 32, 40, 48, and 56 may generally execute, process, or run instructions, code, code segments, software, firmware, programs, applications, apps, processes, services, daemons, or the like. The processing elements 32, 40, 48, and 56 may also include hardware components, such as finite-state machines, sequential and combinational logic, and other electronic circuits that may perform the functions necessary for the operation of embodiments of the current inventive concept. The processing elements 32, 40, 48, and 56 may be in communication with the other electronic components through serial or parallel links that include address busses, data busses, control lines, and the like.

The point of sale device 20 may be embodied by a smart watch, a smart phone, a personal digital assistant (PDA), a tablet, a palmtop or laptop computer, a notebook, a netbook, smart glasses, wearable and non-wearable electronics (e.g., any IoT device), or other mobile device.

The point of sale device 20 may include a contact terminal, a wireless terminal configured to interface with a wireless device, a magnetic stripe terminal configured to interface with a magnetic stripe device, a combined terminal or other terminals for conducting financial transactions. A combined terminal may be designed to interface with any combination of the aforementioned devices. Some terminals can be contact terminals with plug-in contactless readers. It should be noted that the principles of construction outlined above are merely exemplary, and the point of sale device 20 may comprise any known financial transaction reader(s).

Exemplary Computer-Implemented Method

Figure 4:
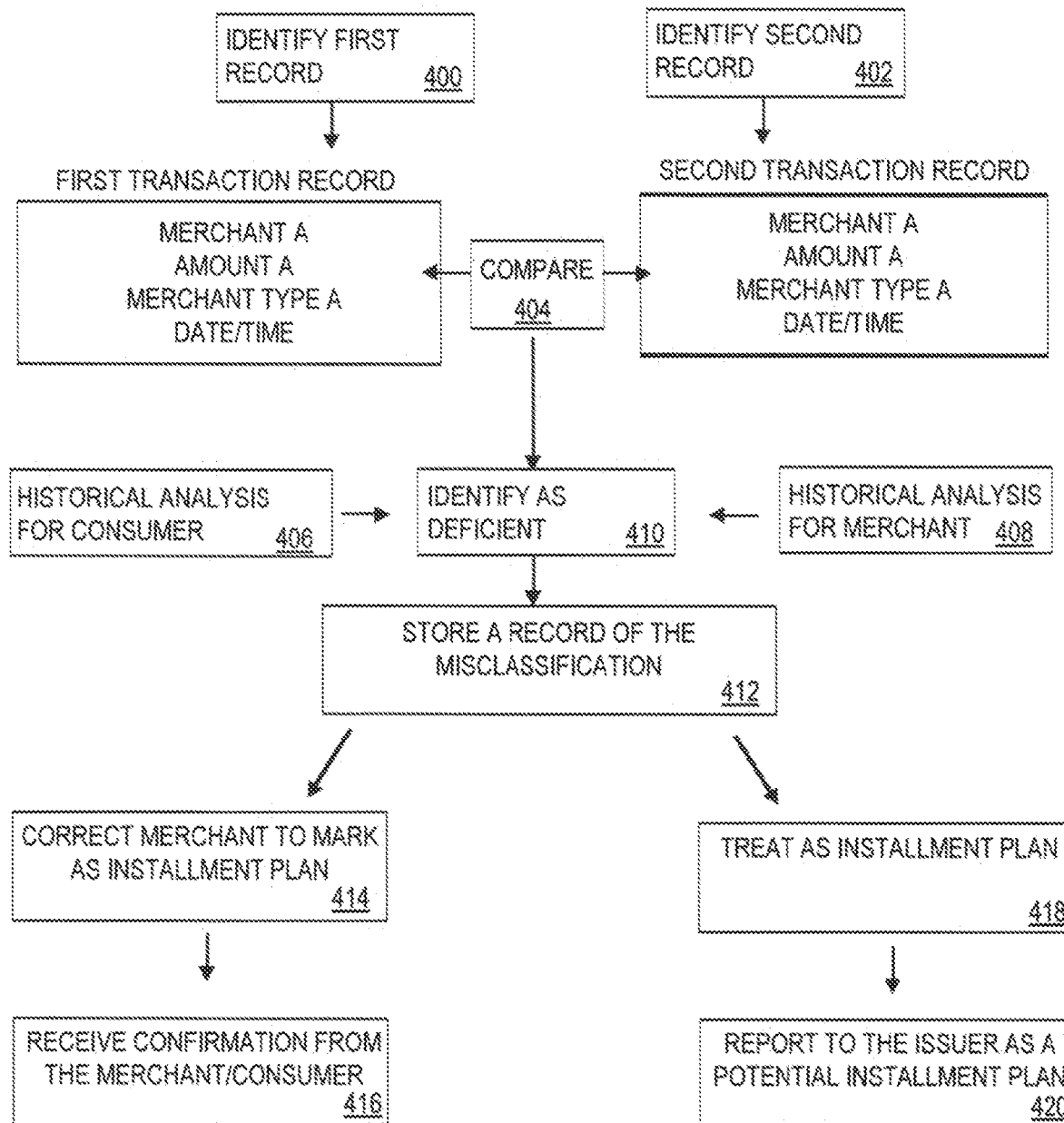

FIG. 4 depicts a listing of steps of an exemplary computer-implemented method for identifying non-reported installment payments and taking remedial actions thereon. Some steps may be performed concurrently as opposed to sequentially and may in some cases be performed in a different order. In addition, some steps may be optional. The computer-implemented method is described below, for ease of reference, as being executed by exemplary devices and components introduced with the embodiments illustrated in FIGS. 3A-D. For example, the steps of the computer-implemented method may be performed by the acquirer server 14, the network server 16, the issuer server 18, the point of sale device 20 through the utilization of processors, transceivers, hardware, software (such as APIs and/or software applications 36, 44, 52, and/or 60), firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs, such as a mobile application and a control software application, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Turning to FIG. 4, exemplary steps performed in embodiments of the invention are shown. FIG. 4 includes exemplary steps in the determination of a non-reported installment payment and exemplary steps in the remedial actions that may be taken based upon that determination. These steps may be performed, in whole or in part, by the credit network, the issuer, the acquirer, or some other entity. Typically, these steps will be performed by one or more processing elements. Each transaction record may be a transaction request message, a transaction approval message, a ledger and/or other record of past or present transactions, or a portion thereof. The transaction records may be recorded and stored in any of numerous ways. For example, the credit network may keep a record of all transactions requested and approved. These records may be organized chronologically, by amount, by type, by the consumer, by the merchant, by the merchant type, by the acquirer, by the issuer, or in some other manner. Thus, the processing element may compare numerous transaction records based upon any of numerous criteria. The processing elements may analyze for patterns in a vast number of transaction records to identify non-reported installment payments. This step may be performed periodically, continuously, or upon certain conditions. For example, these steps may be performed once per day for each issuer.

In Steps 400 and 402, the processing element accesses the authorization database 22 to select two or more transaction records for comparison. The authorization database 22 is populated by records of the authorizations approved and/or pending on the credit network (or among multiple credit networks). As an example, the authorization database 22 may be updated automatically upon approval of a transaction request; periodically by all the transaction records approved during that interval (such as once per second, once per minute, once per hour, once per day, or other interval); or upon request by an administrator, other entity, or software application. The authorization database 22 is communicatively coupled to the network server 16 (as shown in FIG. 2). Thus, the network server 16 may select and analyze the transaction requests (as discussed below) in a batch or continuously. Selection of transaction requests may be performed by filtering a set of transaction requests and performing the discussed steps on the filtered set of transaction requests (which may be larger than two transaction requests).

As part of these steps, the processing element may acquire the first transaction record corresponding to a transactional entity. The first transaction record includes a set of standard data fields in a first state. The processing element may also acquire the second transaction record corresponding to the transactional entity, the second transaction record including the set of standard data fields in a second state.

The second state is distinct from the first state at least because they correspond to different transaction records, although some or all contents of the corresponding data fields may be identical. That is, the second state and the first state may share the same combination of values (and, possibly, lack or absence of values) within the set of standard data fields. Comparison of the set of standard data fields for the first transaction record (i.e., the set of standard data fields in the first state) with the set of standard data fields for the second transaction record (i.e., the set of standard data fields in the second state) may thus simply yield a conclusion that the first state and the second state of the respective records are defined by the same combination of values and omitted values. Alternatively, the combination of values and, possibly, empty fields may vary between the first transaction record and the second transaction record without departing from the spirit of the present invention.

In Step 400, the processing element selects a first transaction record. The first transaction record includes various information about a first transaction of the transactional entity and other parties involved. The first transaction record may be in the above-discussed ISO format, or some other format. Similarly, the transaction record may include a set of information retrieved from the ISO format message. Thus, the processing element may identify and store at least a portion of the information sent through transaction request messages and/or transaction authorization messages for later analysis (as well as other record-keeping purposes), such as by sending said portion to the authorization database 22.

In embodiments of the invention, the first transaction record may include some or all of the following data fields and corresponding elements. First, the first transaction record may include a merchant identifier. The merchant identifier is shown in FIG. 4 as "Merchant A." The merchant identifier may be a number, a name, an alphanumeric sequence, or some other identifier. Second, the first transaction record may include an amount identifier. The amount identifier is shown in FIG. 4 as "Amount A." The amount identifier may include a dollar amount, an interest amount, a value amount, or other monetary amount indication associated with the transaction. Third, the first transaction record may include a date/time identifier. The date/time identifier may include date information, time information for the request, time information for the approval, time information for the completion. It should be appreciated that subsequent non-reported installment payments will often be sent at a standardized or recurring date and time, thus the date and/or time of the transaction may be considered in the determination. Fourth, the first transaction record may include a merchant type identifier. The merchant type identifier is indicative of the type of merchant involved in the transaction. It should be appreciated that non-reported installment payments will be most common in certain types of merchants, such as the smartphone retailers discussed above. In certain types of merchants, such as those that sell a wide variety of goods, these non-reported installment payments may also be more common because it is not a normal transaction for the merchant. The first transaction record may also include other information that may be relevant to the analysis, such as a description of the goods and services involved.

The first transaction record, in embodiments, will lack an installment indication. Specifically, the first transaction record may be deficient in that the standard data elements which would be indicative of an installment plan are blank, incomplete, or otherwise non-indicative of an installment plan. The installment indication may be lacking or may affirmatively indicate that the transaction is not part of an installment plan. It is this lack of reporting of the installment indication that embodiments of the invention will identify and remediate. In an embodiment, the processing element will not analyze transaction records affirmatively marked—e.g., via standardized data field(s) dedicated to installment plan transactions—as installment plan transactions. For instance, Data Element Subfield 4 may have a value of 4, indicating that it is part of an installment plan transaction and need not be analyzed further as potentially corresponding to an unreported installment plan payment.

In an embodiment, data of transaction records analyzed according to embodiments of the present invention is defined by the specifications of ISO. More particularly, ISO 8583 specifies message structure, format and content, data elements and values for data elements comprising a common interface by which financial transaction card-originated messages can be interchanged. While certain transaction data elements may be considered optional and others required under common implementations of ISO 8583, depending on the processing entity(ies) and/or regions in question for example, such variances are well understood by a person of ordinary skill.

In embodiments of the invention, the processing element of the network server 16 may specifically analyze transactions associated with telecommunication companies, as these may be more likely to involve unreported installment plan transactions for smartphone purchases or the like. These transactions can be identified by analyzing the industry or merchant category code(s) associated with corresponding payment messages or transaction requests. For example, the industry name or merchant category code of such a transaction may correspond to Communications, Telecommunications, and Cable Services (CTS) merchants.

In Step 402, the processing element identifies a second transaction record. The processing element may further identify a third transaction record, a fourth transaction record, etc. The second transaction record may include similar information as was discussed above as to the first transaction record. Typically, the second transaction record will be for the same consumer and the same merchant as the first transaction record. Thus, the processing element may filter or otherwise identify a set of transaction records which include matches of consumer (e.g., transactional entity) and merchant. In some instances, the processing element may begin with a merchant (based upon the merchant type, as discussed above) and identify repeated consumer transactions for that merchant. In other instances, the processing element may begin with a consumer (such as a known high-risk consumer) and identify repeated transactions at a single merchant. In still other instances, the processing element may consider all transaction requests (or a filtered subset of transaction requests) to identify these matches. As such, in considering the first transaction record, the processing element may retrieve all, most, many, or some other transaction records with both the same consumer and the same merchant. Thus, the processing element may identify potential patterns in transaction requests that may be indicative of the non-reported installment plans.

In embodiments, the processing element selects potential second transaction records for further consideration based upon a trigger. In some embodiments, the trigger is time-based. In these embodiments, the processing element will begin the analysis discussed herein based upon the interval of time elapsing. In other embodiments, the trigger is request-based. In these embodiments, the processing element will begin the analysis based upon a specific request (such as by an administrator via the network server 16). The specific request may include parameters to filter the transaction records for the analysis (for example, focusing on a specific transaction entity, a specific merchant, or a specific merchant type). In still other embodiments, the trigger may be audit-based. In these embodiments, certain merchants, transaction entities, or other designations may be selected for analysis. Thus, the processing element may identify the first transaction record (such as based upon a daily review of all transaction records, transaction records of a certain merchant type, transaction records of a certain consumer, or other criteria) and select one or more other potentially related transaction records.

As discussed in more detail below, such transaction records may be analyzed to isolate repeat transactions on the same (or similar) account that are not listed as recurring or installment plan-related (as discussed above). For example, if the first transaction record is a $20 authorization request transmitted by a communication technology provider within an ecommerce payment channel, the processing element of the credit network may access the authorization database 22. More particularly, the processing element may isolate transactions represented in the historical database that involve the same transactional entity associated with the first transaction record, and analyze respective ones of such transaction records for elements that suggest the presence of an underlying installment payment plan. As noted elsewhere herein, such elements may evidence repeat payments for the exact same amount, made on the same day of month, made using the same account number, and/or otherwise fitting the profile of a typical installment plan payment. In the preferred embodiment, transaction records already marked as associated with an installment plan may not be analyzed to determine such association. However, in an embodiment, such already-marked transaction records may be used to confirm the association of other corresponding payments with such an installment plan even where the other corresponding payments are initially unmarked.

In Step 404, a processing element compares two or more transaction records, including the above-identified first transaction record and the above-identified second transaction record. In some instances, additional transaction records may also be compared. The comparison step identifies patterns, consistencies, and other indicia that the two or more transaction records are associated with a non-reported installment plan. The processing element may be the above-discussed processing element 48 of the network server 16, shown in Figured 3C, or one of the other processing elements 40, 56. Returning to an earlier discussion, it should be noted again that many standardized data field formats include fields dedicated to describing installment payment transactions. More particularly, such fields may include values describing the dollar amount of the installment, current installment number and the total number of installments. Also as noted above, such data, if provided, may be used by an issuer to assess risk. For instance, to follow the example discussed elsewhere herein, if the issuer sees a dollar amount of $33, with an installment number of 3 and a total number of installments of 24—this indicates to the issuer that this is the third payment of 24 total payments for an $800 item. This information would then be accurately reflected in, for instance, the issuer's fraud models as well as its chargeback system.

In Step 406, the processing element may perform a historical analysis for one or more of the transactional entities or consumers identified in the first transaction record and the second transaction record. This historical analysis may identify trends in the purchasing of the individual consumer, with or without consideration of particular merchant(s). For instance, such trends may be indicative that a consumer is fraudulently making purchases that are correlated to increased risk of non-reported installment payments. If the consumer has a pattern of purchases indicative of such behavior, it may enhance confidence in assessment(s) regarding non-reported installment plan(s), lead to one or more flag(s) for further analysis, or otherwise inform implementation of the services outlined herein. The historical analysis may also analyze other charges of the consumer to explain the first transaction record. For example, in some instances, the consumer may make payments for a monthly service plan to a local smartphone retailer, instead of directly to the service plan provider. Based on this determination, the processing element may scrutinize other historical transaction records to determine whether there are other charges related to cell phones transacted by the consumer. For instance, if the user has a monthly charge from a service plan provider and a new potentially recurring charge from a local smartphone retailer, it is more likely that the new potentially recurring charge is a non-reported installment plan. As another example, the historical analysis for the consumer may include a determination whether a non-reported installment plan would be of any consequence, which may reduce the computing load required to meet issuing bank requests based on threshold risk(s). If a consumer has a high credit score (or other high credit worthiness), a non-reported installment plan may be moot for practical reasons. Thus, the processing element may focus analysis on consumers for which the non-reported installment plan would be impactful, a consideration for the issuer, or otherwise noteworthy.

In Step 408, the processing element performs a historical analysis for a merchant. The historical analysis may identify one or more merchant(s) that have been flagged in connection with prior transactions for failing to populate installment plan indication fields. This identification may be used to narrow the field of transaction request messages or records subject to analysis, may weigh in favor of a determination that a transaction request message originating with the merchant is in fact misclassified, or may increase confidence in an assessment of misclassification. The historical analysis may also determine whether it is common practice for the merchant to indicate installment plans on transaction request messages. If so, the merchant's transaction request messages may enjoy the inverse treatment from those outlined immediately above.

In Step 410, the processing element identifies one or more deficiencies in one or more transaction records that correspond to a potential non-reported installment plan. That is, based upon the analysis of one or more transaction records, the processing element identifies the one or more transaction records as being indicative of a non-reported installment plan. The processing element may also perform other analyses, such as estimating the total liability associated with the non-reported installment plan. For example, if the merchant is a smartphone retailer that commonly has twenty-four monthly installment plans, the processing element may calculate a total liability likely associated with the non-reported installment plan by multiplying the monthly amount by twenty-four. Similarly, the processing element may estimate the remaining balance on the liability, estimate the type of good associated with the first transaction record, and other considerations.

This step may be performed, at least in part, by analyzing the first state and the second state of the corresponding transaction records to identify a deficiency of the standard data fields of one or both of the first transaction record and the second transaction record. The deficiency corresponds to a misclassification of an installment payment transaction of the transactional entity. The misclassification may be a failure (intentionally or unintentionally) of the merchant (or other source of the transaction request) to correctly mark the transaction request as being related to an installment program.

The step may also include storing a record of the misclassification. The record identifies one or both of the first transaction record and the second transaction record as being associated with the misclassification. The record may be accessed or recalled as part of a remedial action, such as those discussed below. The record may be stored in a non-transitory computer readable storage medium. The record may be generated by and stored by the credit network.

In Step 412, the processing element determines a likelihood that the potential non-reported installment plan is an actual non-reported installment plan. For example, if the merchant is one which has been previously identified and confirmed to be submitting non-reported installment plans, and the amount of the transaction is similar or the same as amounts in the previous non-reported installment plans, then there is a high likelihood that the transaction record is indicative of a non-reported installment plan.

This step may include verification. The processing element may request or require additional information as to the installment nature of the transaction, the type of goods or services purchased, and detection of fraud. These requests for additional information may be sent to the consumer, the merchant, the acquirer, the credit network, the issuer, or some outside party. The verification may reduce or increase the likelihood of a non-reported installment plan.

Various remedial actions will now be discussed, which may be taken by the processing element or by another processor or entity. Remedial actions take steps to treat the transaction record as an installment plan, prevent or reduce the likelihood that future similar transactions will be non-reported installment plans, provide additional information for the issuer or other decision maker, prevent the transaction, replevin the goods, or take other remedial steps. Two example remedial actions are shown in FIG. 4. It should be appreciated that other remedial actions may be taken additionally or alternatively to those discussed herein.

In Step 414, the processing element instructs the merchant to mark appropriately as installment plans. This instruction may be provided directly to the merchant, or indirectly such as through the acquirer. The instruction may request or require conformation to the above-discussed ISO standard or some other standard of reporting. It should also be appreciated that in some embodiments of the invention, this instruction may be directed to the acquirer such that the acquirer can confirm the nature of the transaction before sending along a transaction request message. The processing element of the credit network may, on a rolling basis or periodically according to batch processing operations, prepare a reporting e-mail or other electronic transmission for automatically notifying merchants responsible for deficient payment messages likely associated with installment plans. The reporting transmission may automatically be populated with notices of each deficient standardized data field identified according to the analyses outlined above.

In Step 416, the processing element receives a confirmation from the merchant that the merchant will begin utilizing the correct format and/or otherwise provide the installment plan indicator on future transaction request messages. The processing element may continue to monitor future transactions from the merchant to determine if future transaction request messages include an installment plan indicator. Thus, the processing element is providing a practical application by altering behavior in the real world and providing a tangible benefit to issuers and other decision makers.

In Step 418, the processing element treats the financial record as being associated with an installment plan. This step may be performed if the determined likelihood is above a certain threshold, upon a response from the consumer or the merchant, or upon other considerations. The processing element may then continue steps otherwise performed while treating the financial record as being indicative of an installment plan. Additionally or alternatively, the processing element may re-perform previously completed steps (those discussed herein, or other steps performed) with this updated information.

In Step 420, The processing element may notify the issuer or other decision maker of the installment plan. This step may include generating and sending a periodic report to the issuer of suspected or known non-reported installment plans which the processing element has identified. The periodic report may include transaction identifiers, consumer identifiers, merchant identifiers, a likelihood that the transaction is a non-reported installment plan, and other information for the issuer. With this information, the issuer may perform additional steps such as verification, treating the transactions as installment plans, sending messages to the merchant and/or consumer, or performing other remedial actions. Thus, these real world actions are practical applications of the analysis performed herein.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed, and substitutions made herein without departing from the scope of the invention as recited in the claims.

We claim:

1. A computer-implemented method for isolating transaction records having deficient standard data elements, comprising:
   acquiring a first transaction record corresponding to a transactional entity, the first transaction record including a set of standard data fields in a first state;
   acquiring a second transaction record corresponding to the transactional entity, the second transaction record including the set of standard data fields in a second state;
   analyzing the first state and the second state to identify a deficiency of the standard data fields of one or both of the first transaction record and the second transaction record, the deficiency corresponding to a misclassification of an installment payment transaction of the transactional entity and the analysis including analyzing one or both of the first state and the second state to determine that a merchant associated with the first transaction record and the second transaction record omitted entry of or erroneously entered an installment plan indicator value in a corresponding installment plan indicator standard data field of the set of standard data fields;
   storing a record of the misclassification, the record identifying one or both of the first transaction record and the second transaction record; and
   on a rolling basis or periodically according to batch processing operations, automatically generating and transmitting a notification to the merchant identifying the deficiency corresponding to the omission or erroneous entry of the installment plan indicator value in the corresponding installment plan indicator standard data field.

2. The computer-implemented method of claim 1, the set of standard data fields including a date data field, the date data field of the first transaction record and the second transaction record including data elements corresponding to respective transaction dates, the deficiency being at least in part identified based on a determination that the transaction dates for the first transaction record and the second transaction record respectively fall on the same day of two different months.

3. The computer-implemented method of claim 1, the set of standard data fields including an amount data field, the amount data field of the first transaction record and the second transaction record including data elements corresponding to respective transaction amounts, the deficiency being at least in part identified based on a determination that the transaction amounts for the first transaction record and the second transaction record are identical.

4. The computer-implemented method of claim 1, the set of standard data fields including a consumer identifier data field, the consumer identifier data field of the first transaction record including data elements corresponding to the transactional entity, further comprising:
   selecting the second transaction record based upon the first transaction record and a historical analysis of the transactional entity, wherein the consumer identifier data field of the second transaction record is indicative of the transactional entity.

5. The computer-implemented method of claim 1, further comprising:
   monitoring additional transaction records that correspond to the transaction entity for an installment plan indicator.

6. The computer-implemented method of claim 1, wherein—
   the merchant corresponds to a first merchant type,
   the first merchant type matches a pre-determined classification for merchants that may sell smartphones,
   the first transaction record and the second transaction record both lack the installment plan indicator value.

7. The computer-implemented method of claim 1, the set of standard data fields including a merchant type data field, the merchant type data field of the first transaction record and the second transaction record including data elements corresponding to a type of merchant, the deficiency being at least in part identified based on a determination that the type of merchant is identical for the first transaction record and the second transaction record and matches a pre-determined classification for merchants that may sell goods under installment plans.

8. The computer-implemented method of claim 7, wherein the merchant type corresponds to a smartphone retailer.

9. A computer system configured to isolate transaction records having deficient standard data elements, the system including a processing element configured to:
acquire a first transaction record corresponding to a transactional entity, a merchant, and a merchant type, the first transaction record including a set of standard data fields in a first state;
acquire a second transaction record corresponding to the transaction entity, the merchant, and the merchant type, the second transaction record including the set of standard data fields in a second state,
determine that the merchant type is indicative that the transaction relates to a smartphone purchase;
analyze the first state and the second state to identify a deficiency of the standard data fields of both of the first transaction record and the second transaction record, the deficiency corresponding to a misclassification of an installment payment transaction of the transactional entity and the analysis including analyzing one or both of the first state and the second state to determine that the merchant associated with the first transaction record and the second transaction record omitted entry of or erroneously entered an installment plan indicator value in a corresponding installment plan indicator standard data field of the set of standard data fields;
store a record of the misclassification, the record identifying one or both of the first transaction record and the second transaction record; and
on a rolling basis or periodically according to batch processing operations, automatically generate and transmit a notification to the merchant identifying the deficiency corresponding to the omission or erroneous entry of the installment plan indicator value in the corresponding installment plan indicator standard data field.

10. The computer system of claim 9,
the set of standard data fields including a transaction timestamp data field,
the transaction timestamp data field of the first transaction record and the second transaction record including data elements corresponding to respective dates of the transaction,
the deficiency being at least in part identified based on a determination that the transaction timestamp for the first transaction record is indicative of a certain day of a first month and the second transaction record is indicative of said certain day of a second month.

11. The computer system of claim 9,
the set of standard data fields including an amount data field,
the amount data field of the first transaction record and the second transaction record including data elements corresponding to respective transaction amounts,
the deficiency being at least in part identified based on a determination that the transaction amounts for the first transaction record and the second transaction record are identical.

12. The computer system of claim 9, wherein the processing element is further configured to:
select the second transaction record based upon a historical analysis of the transactional entity requesting the transaction of the first transaction record.

13. The computer system of claim 9, wherein the processing element is further configured to:
monitor additional transactions to determine if additional transaction request messages include an installment plan indicator.

14. A non-transitory computer readable storage medium having a computer program stored thereon for isolating transaction records having deficient standard data elements, wherein the computer program instructs at least one processing element to perform steps comprising:
acquiring a first transaction record corresponding to a transactional entity, a merchant, and a merchant type, wherein the first transaction record includes a set of standard data fields in a first state;
acquiring a second transaction record corresponding to the transaction entity, the merchant, and the merchant type, wherein the second transaction record includes the set of standard data fields in a second state, wherein the merchant type is indicative that the transaction relates to a smartphone purchase;
analyzing the first state and the second state to identify a deficiency of the standard data fields of both of the first transaction record and the second transaction record, the deficiency corresponding to a misclassification of an installment payment transaction of the transactional entity and the analysis including analyzing one or both of the first state and the second state to determine that the merchant associated with the first transaction record and the second transaction record omitted entry of or erroneously entered an installment plan indicator value in a corresponding installment plan indicator standard data field of the set of standard data fields;
storing a record of the misclassification, the record identifying one or both of the first transaction record and the second transaction record; and
on a rolling basis or periodically according to batch processing operations, automatically generating and transmitting a notification to the merchant identifying the deficiency corresponding to the omission or erroneous entry of the installment plan indicator value in the corresponding installment plan indicator standard data field.

15. The non-transitory computer readable storage medium of claim 14,
the set of standard data fields including a transaction timestamp data field,
the transaction timestamp data field of the first transaction record and the second transaction record including data elements corresponding to respective dates of the transaction,
the deficiency being at least in part identified based on a determination that the transaction timestamp for the first transaction record is indicative of a certain day of a first month and the second transaction record is indicative of said certain day of a second month.

16. The non-transitory computer readable storage medium of claim 14,
the set of standard data fields including an amount data field,
the amount data field of the first transaction record and the second transaction record including data elements corresponding to respective transaction amounts,
the deficiency being at least in part identified based on a determination that the transaction amounts for the first transaction record and the second transaction record are identical.

17. The non-transitory computer readable storage medium of claim 14,
   wherein the computer program further instructs the at least one processing element to perform steps comprising:
   selecting the second transaction record based upon a historical analysis of the transactional entity requesting the transaction of the first transaction record.

18. The non-transitory computer readable storage medium of claim 14, wherein the computer program further instructs the at least one processing element to perform steps comprising:
   monitoring additional transactions to determine if additional transaction request messages include an installment plan indicator.

* * * * *